(No Model.) 2 Sheets—Sheet 1.
W. D. WANSBROUGH.
LAWN MOWER.
No. 503,509. Patented Aug. 15, 1893.
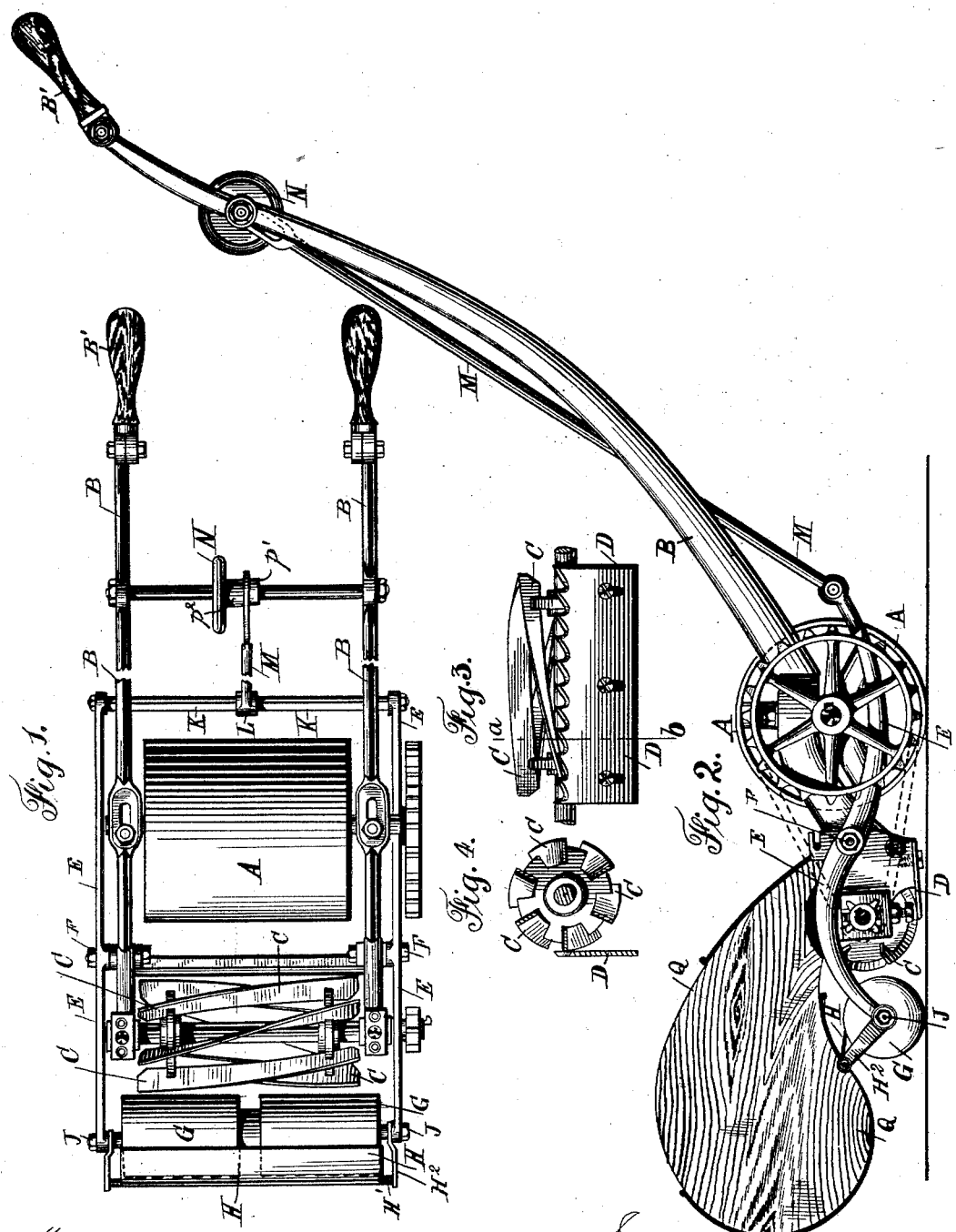

(No Model.) 2 Sheets—Sheet 2.
W. D. WANSBROUGH.
LAWN MOWER.
No. 503,509. Patented Aug. 15, 1893.
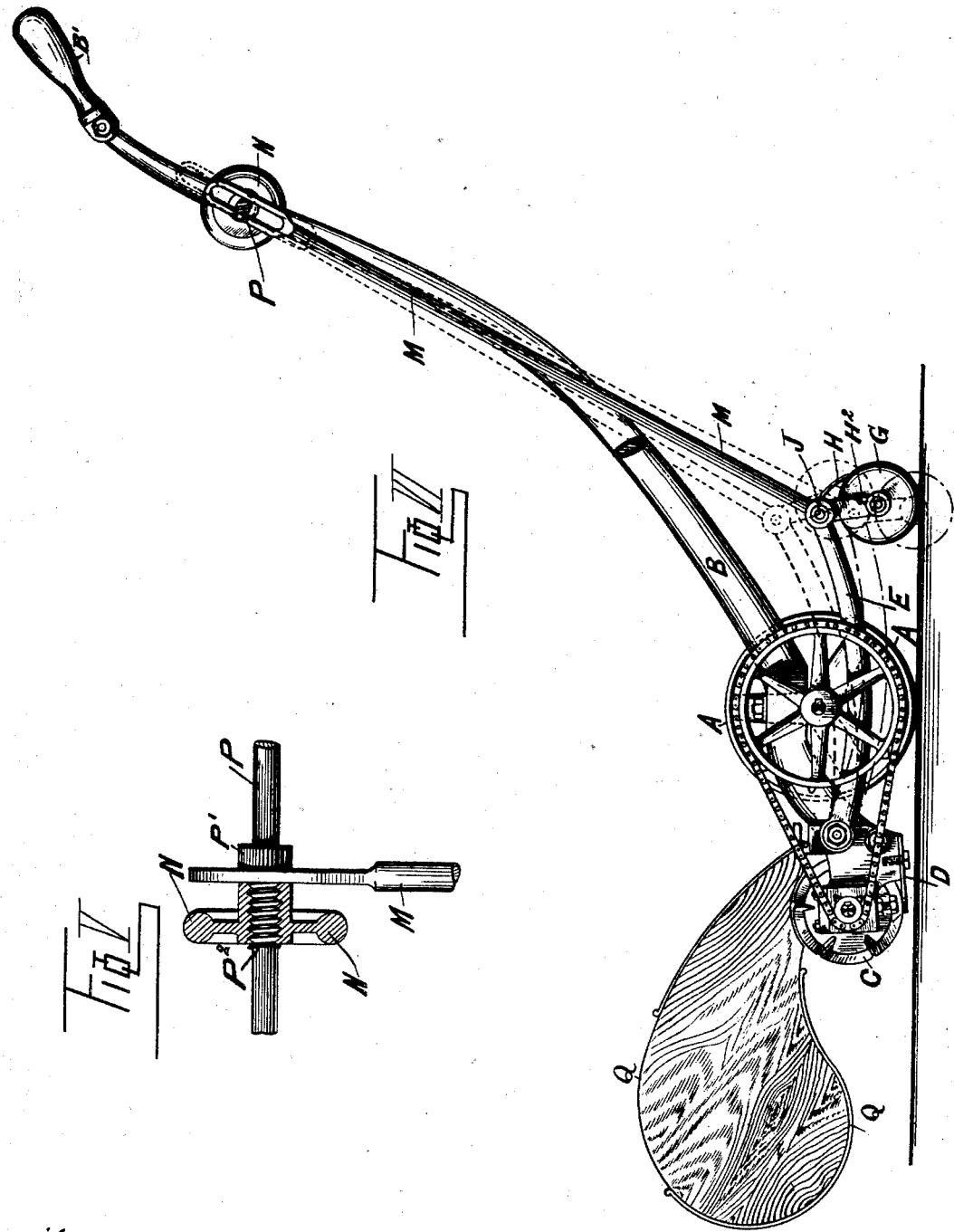
Witnesses.
J. G. Meyers Jr.
Robert Emmett
Inventor:
William D. Wansbrough.
By James L. Norris.
Atty.

UNITED STATES PATENT OFFICE.

WILLIAM DYSON WANSBROUGH, OF LINCOLN, ENGLAND.

LAWN-MOWER.

SPECIFICATION forming part of Letters Patent No. 503,509, dated August 15, 1893.

Application filed March 22, 1892. Serial No. 425,910. (No model.) Patented in England November 6, 1891, No. 19,214.

*To all whom it may concern:*

Be it known that I, WILLIAM DYSON WANSBROUGH, a subject of the Queen of Great Britain, residing at St. Catherines, Lincoln, in the county of Lincoln, England, have invented new and useful Improvements in or Connected with LawnMowers, (patented in Great Britain, No. 19,214, dated November 6, 1891,) of which the following is a specification.

This invention relates to lawn mowers, and has for its objects to construct a hand mowing machine, which shall possess all the features of lightness, durability and simplicity of construction, and at the same time be easy of manufacture.

To accomplish this object my invention consists in the features of construction and the combination or arrangement of devices as hereinafter described and claimed, whereby the machine may be easily adjusted to accommodate itself to cut grass long or short, as desired.

In order to enable others skilled in the art to make, use and construct my invention, I will describe the same in detail, reference being made to the accompanying drawings, in which—

Figure 1, is a plan view of my machine, showing the handles broken away. Fig. 2 is a side elevation, showing the rocking balance frame, with the adjusting roller applied to front end thereof. Fig. 3, is a detail view of the stationary cutter blade. Fig. 4, is a detail view of the revolving cutter. Fig. 5, is a detail view of the clamping wheel, and a portion of the adjustable rod, which carries the balance wheel. Fig. 6, is a side elevation of the machine, showing the rocking balance frame, with the adjusting roller applied in rear of the main wheel.

Referring now to the drawings, the reference letter A designates the grass roller, or drum, which is connected to the main frame B, in any suitable manner. The frame B is provided with handles B', and a cross bar or rod P, having a rigidly attached collar P', and screw threads P², upon which a clamping wheel N, is screwed for the purpose of holding the rod M in any position desired to raise or lower the cutting mechanism of the machine, to accommodate itself to different lengths of grass, as will hereinafter be described.

Upon the forward end of the main frame B, is mounted the revolving cutter C, which is geared and operated through the medium of a sprocket chain, and sprocket wheels, attached respectively to the shaft of the revolving cutter, and to the roller or drum A.

The letter D represents the stationary cutter blade, which is provided with serrations or saw-like teeth, arranged in the plane of the body of the blade as shown in Fig. 3. This blade is attached to the under side of the main frame B, by means of screws and is arranged to be adjusted in relation to the revolving cutter C, so as to form a shear cut. By forming a stationary cutter blade with serrations or saw-like teeth as herein shown, a much cleaner cut is obtained, and a considerable amount of friction overcome, for it will readily be seen that as the machine is advanced in operation and the grass comes in contact with the serrations or saw-like teeth, it will be divided into groups or bunches which will nest themselves, or be entrapped in the triangular spaces formed by the teeth, and the revolving cutter, with its spiral blades, at the same time sweeping over the upper edge of the stationary blade effects a clean cut, with a minimum of friction, which naturally occurs with the use of the ordinary straight edged knife, where the grass is given a chance to slip or slide along the edge of the same, should it be a little tough, or the blade slightly dull.

On the main frame B is mounted a rocking balance frame, consisting of side levers E rigidly connected at their rear extremities by a connecting cross-rod K, so that if this cross-rod be raised or lowered both levers E will be simultaneously moved. The levers E of the rocking balance frame are mounted intermediate their extremities on pivots or bearings F secured to the main frame B, and the front extremities of the levers carry a ground roller G which acts as a fulcrum to raise and lower the cutting mechanism, and is provided with a scraper H attached to a rod H' held in position by links H² connected to the shaft of the roller G by means of nuts J.

To the central portion of the connecting cross-rod K is secured a collar L on the lower end of the rod M, which rod extends upward in line with the handles, and is provided at its upper end with an elongated slot through which the cross-bar P extends at a point between the rigid collar P' and the hand wheel N. It will now be observed that by raising or lowering the rod M which is adapted to be held in any desired position by means of the clamp-wheel N, the roller G will accordingly be raised or lowered, as the case may be, which will in turn elevate or lower the cutting mechanism to accommodate itself to cut grass either long or short.

Upon the forward end of the machine I have placed a grass collecting trough or box Q, which may be fastened to the main frame in any suitable manner.

In the modification shown in Fig. 6, the general construction of the machine is the same, with the exception that the adjusting roller G, is arranged in the rear of the machine, instead of at the front.

The rocking balance frame E E instead of being pivoted midway its ends, is loosely mounted at its forward end, to the same point of pivotal connection as before, and at its rear end is connected by the rod K, to which are attached the links $H^2$, carrying roller G, and provided with the scraper H which is attached to the rod K, in any convenient manner.

What I claim is—

1. The combination with a main frame, a connecting mechanism, and guiding handles connected with the main frame, of a rocking balance frame composed of side levers pivotally mounted on the main frame, carrying a ground roller and rigidly connected at their rear extremities by a connecting cross-rod, a cross-bar connected with the upper portion of the main frame in proximity to the handles and provided with a screw threaded portion and a rigid collar, a lengthwise adjustable bar or rod connected at its lower end with the connecting cross rod of said levers, and having a slotted upper end through which the screw-threaded cross bar extends, and a screw clamping wheel mounted on the threaded portion of the cross-bar for clamping the slotted end of the bar or rod against the collar, substantially as described.

2. The combination with a main frame, a cutting mechanism, and guiding handles connected with the main frame, of a cross bar connected with the upper portion of the main frame in proximity to the handles and provided with screw-threaded portions and a rigid collar, a lengthwise adjustable bar or rod connected at its lower end with the rear end of the balance frame and having a slotted upper end through which the screw-threaded cross bar extends, and a screw-clamping wheel mounted on the threaded portion of the cross-bar for clamping the slotted end of the bar or rod against the rigid collar, substantially as described.

In witness whereof I have hereto signed my name, in the presence of two subscribing witnesses, this 21st day of December, 1891.

WILLIAM DYSON WANSBROUGH.

Witnesses:
HERBERT E. NEALE,
    40 *Monk's Road, Lincoln.*
THOMAS SCOTT KING,
1 *Woodland View, Arboretum Avenue, Lincoln.*